United States Patent [19]
Bandoh et al.

[11] Patent Number: 5,306,119
[45] Date of Patent: Apr. 26, 1994

[54] DUCTED TAIL ROTOR FOR ROTOR CRAFT

[75] Inventors: Shunichi Bandoh; Koichi Egami; Takashi Watanabe, all of Kakamigahara, Japan

[73] Assignee: Kawasaki Jukogyo Kabushiki Kaisha, Kobe, Japan

[21] Appl. No.: 36,381

[22] Filed: Mar. 24, 1993

[30] Foreign Application Priority Data

Mar. 24, 1992 [JP] Japan ................... 4-096986

[51] Int. Cl.⁵ ............................................. B64C 11/06
[52] U.S. Cl. .................................. 416/168 R; 416/203; 415/119
[58] Field of Search ............... 416/131, 133, 147, 167, 416/168 R, 175, 203; 415/119

[56] References Cited

U.S. PATENT DOCUMENTS

| | | | |
|---|---|---|---|
| 872,307 | 11/1907 | Sargent | 416/203 |
| 4,174,137 | 11/1979 | Ferris | 416/168 R |
| 4,253,800 | 3/1981 | Segawa et al. | 415/119 |
| 4,281,966 | 8/1981 | Duret et al. | 416/168 R |
| 4,626,173 | 12/1986 | Moville et al. | 416/168 R |
| 4,863,351 | 9/1989 | Fischer et al. | |

FOREIGN PATENT DOCUMENTS

| | | | |
|---|---|---|---|
| 0521759 | 1/1993 | European Pat. Off. | 415/119 |
| 2524555 | 12/1975 | Fed. Rep. of Germany | |
| 1531536 | 5/1968 | France | |
| 0766812 | 1/1957 | United Kingdom | 415/119 |

*Primary Examiner*—Edward K. Look
*Assistant Examiner*—Christopher Verdier
*Attorney, Agent, or Firm*—Leydig, Voit & Mayer

[57] ABSTRACT

A ducted fan-type tail rotor of a rotor craft in which the tail rotor is surrounded by a tubular duct is provided which includes at least six rotor blades, and pitch horns, each mounted to the respective rotor blades. Each pitch horn is swingable to change a pitch angle of the rotor blade. Some of the pitch horns, the number of which is about a half of the total number of the pitch horns, are mounted to a first type of the rotor blades at a mounting angle larger than a reference mounting angle required to obtain a predetermined thrust, and the remainder of the pitch horns are mounted to a second type of the rotor blades at a mounting angle smaller than the reference mounting angle.

32 Claims, 14 Drawing Sheets

F I G. 18
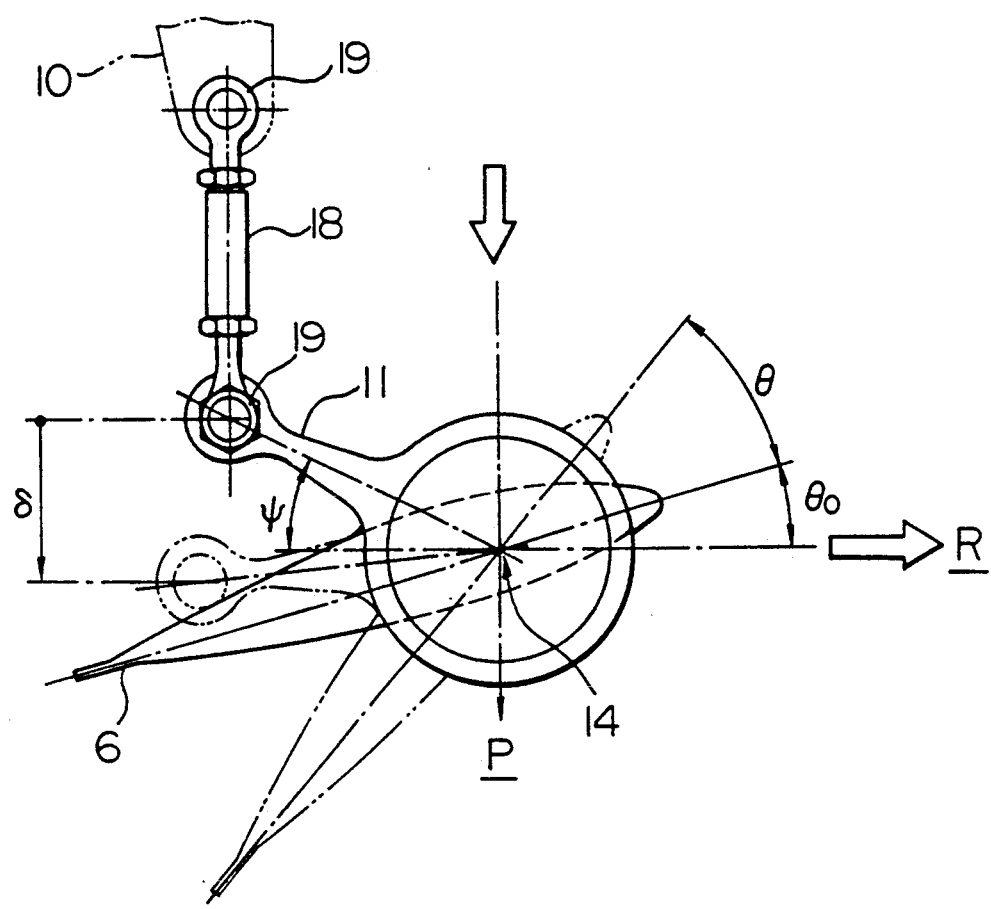

DUCTED TAIL ROTOR FOR ROTOR CRAFT

FIELD OF THE INVENTION AND RELATED ART STATEMENT

The invention relates generally to a tail rotor of a rotor craft, and more particularly to a ducted fan-type tail rotor of the rotor craft.

The ducted fan-type tail rotor comprises a rotor assembly including a plurality of rotor blades, and a tubular duct surrounding the rotor assembly.

The tail rotor of the ducted fan type, unlike an ordi7 nary propeller-type tail rotor, can prevent a mechanic and a passenger on the ground from accidental contacts with the rotor blades since the rotor assembly is covered by the duct. Further, during a flight, near the ground, the rotor blades are prevented from accidental contact with trees or buildings. Therefore, the tail rotor of the ducted fan-type is quite safe.

With respect to the performance of the tail rotor of the ducted fan-type, it has great advantages that blow-out speed is high, and thrust drop called "a vortex ring state" can be prevented due to the tail rotor being surrounded by the duct.

In the tail rotor of the ducted fan-type, in order to decrease an axial length of the duct to reduce the head resistance area thereof, it is required to shorten a chord of the rotor blade. Therefore, in order to obtain a required total area of the rotor blades determined by the horsepower absorbing capacity of the tail rotor, the number of the rotor blades is necessarily increased.

Conventionally, the number of the rotor blades of the ducted fan-type tail rotor of the rotor craft is generally 8 to 13.

On the other hand, the higher the peripheral tip speed of the blade becomes, the better its performance becomes. Therefore, the tip speed of the rotor blade of the tail rotor is generally set to be equal to that of a rotor blade of a main rotor, namely about 180 m/sec to about 220 m/sec. A radius of the tail rotor for small- and medium-size helicopters is generally 1 meter to generally 2 meters, and therefore the rotational speed is 2,500 r.p.m. to 5,000 r.p.m.

In the case where the rotor blades are equiangularly arranged, noises, generated from the tail rotor of the ducted fan-type which rotates at such high speed, are composed mainly of a frequency equal to the product of the rotational speed and the number of blades. Therefore, high-frequency noises of 300 Hz to 900 Hz are generated. The sound pressure level of this high-frequency noise is lower than that of the noise from the main rotor. However, the noise from the main rotor is low-frequency noise, and therefore is not so irritating. The noise from the tail rotor is considered as the main source of a noise in the rotor craft.

There are two methods of reducing the noise from the tail rotor. One is to reduce the tip speed, and the other is to arrange the rotor blades at unequal angular intervals.

(1) Tip Speed Reduction Method

When the tip speed is reduced, the noise is greatly lowered. However, at the same time, the performance is also lowered, and therefore it becomes necessary to increase the diameter of the rotor, which results in a disadvantage that the weight and the cost are increased.

(2) When the rotor blades are arranged at equal angular intervals, a sound pressure peak of high level is generated at a high-frequency band, as described later.

However, with an arrangement with unequal angular intervals between the rotor blades, the sound pressure is a low level, and the peak of the sound pressure is generated at many frequency bands. Such sound is much like a sound produced from a musical instrument, and is not offensive to the ear, and is heard as a low sound. Such an arrangement with unequal angular intervals is quite effective in reducing the noise. However, since the rotor blade mounting portions are disposed very close to one another they interfere with one another. Therefore, the arrangement with unequal angular intervals is not practical from a structural point of view. Even if the arrangement with unequal angular intervals is slightly modified to obtain one with unequal angular intervals, in case that a degree of such modification is within an extent in which adjacent two rotor blades are close to each other without interfering, such modification is not enough to reduce the noise.

OBJECT AND SUMMARY OF THE INVENTION

It is an object of the present invention to provide a tail rotor of a rotor craft which can sufficiently reduce a noise level without reducing the blade tip speed (that is, without deteriorating the performance) and without inviting a structural problem with the mounting of rotor blades, and in which a rasping high-frequency sound is converted into a low-frequency sound.

To this end, according to the present invention, there is provided a tail rotor of a rotor craft, which is surrounded by a tubular duct, the tail rotor comprising at least six rotor blades, and pitch horns mounted to the respective rotor blades, each of the pitch horns being swingable to change a pitch angle of the rotor blade, wherein mounting angles of the pitch horns to the rotor blades, the number of which is about a half of the total number of the rotor blades, are larger than a reference mounting angle of the pitch horn to the rotor blade required to obtain a predetermined thrust, and mounting angles of the pitch horns to the remaining rotor blades are smaller than the reference mounting angle.

BRIEF DESCRIPTION OF THE DRAWINGS

FIG. 18 is a cross-sectional view showing the still another mounting of a rotor blade on a spider.

DETAILED DESCRIPTION OF THE PREFERRED EMBODIMENTS

Figure 1:
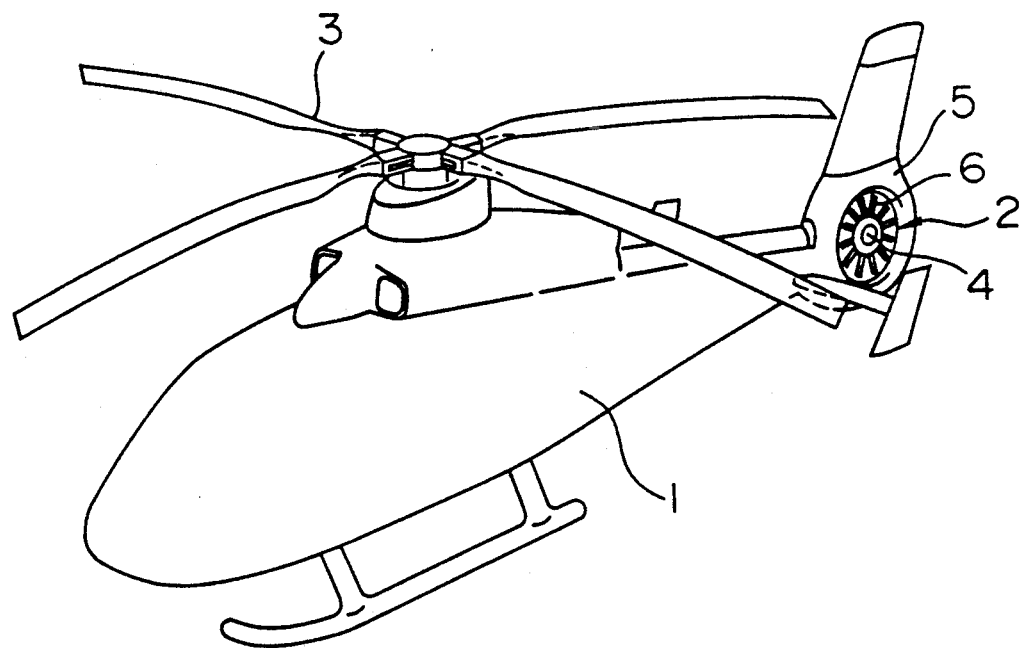
FIG. 1 is a perspective view showing the overall construction of a rotor craft.
Figure 2:
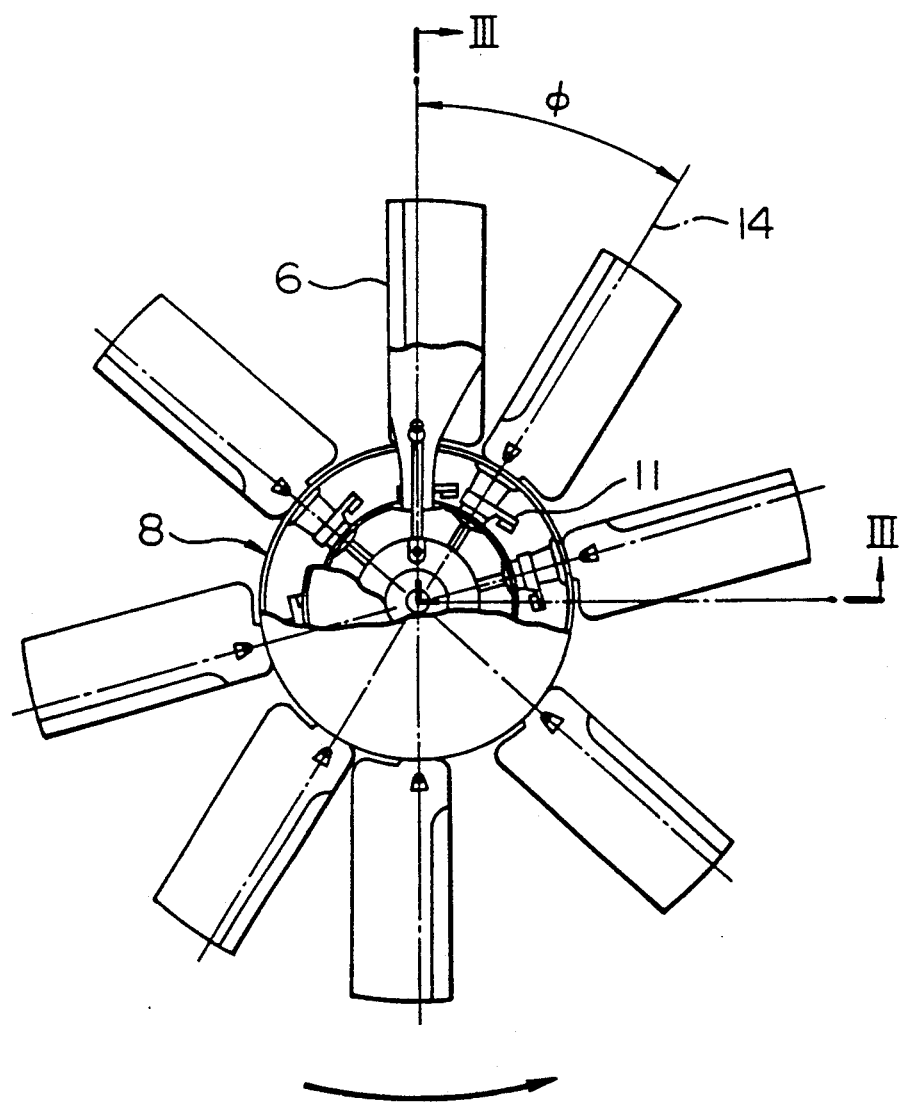
FIG. 2 a plan view of a tail rotor of the rotor craft.
Figure 3:
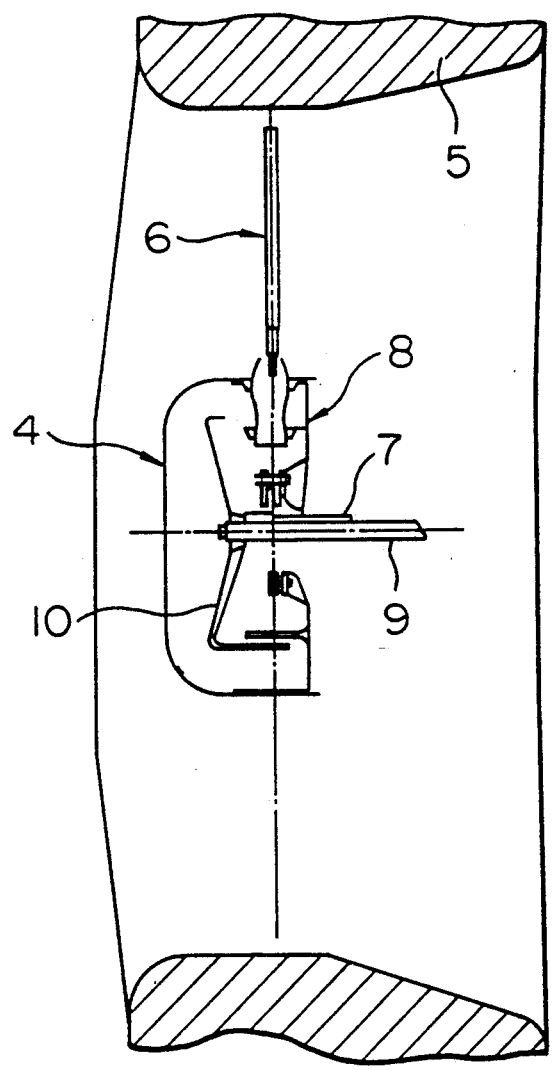
FIG. 3 is a cross-sectional view taken along the Line III—III of FIG. 2.

As shown in FIG. 1, a rotor craft 1 comprises a tail rotor 2 and a main rotor 3. The tail rotor 2 comprises a tail rotor assembly 4, and a tubular duct 5 surrounding the tail rotor assembly 4. As shown in FIGS. 2 and 3, the tail rotor assembly 4 comprises eight (8) rotor blades 6, a hub assembly 8 for mounting the rotor blades 6 on a rotation shaft 7, a control rod 9 for changing the pitch angle of the rotor blades 6 in accordance with the operation of the pilot, and a spider 10.

Figure 4:
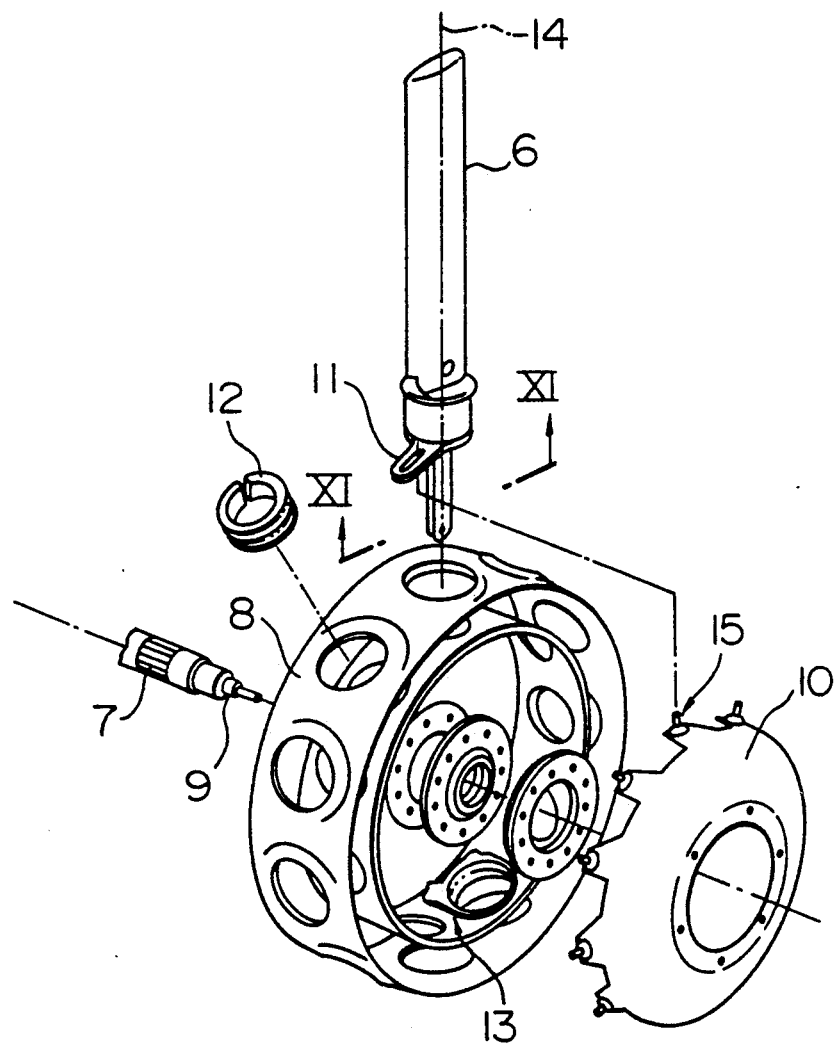
FIG. 4 is an exploded perspective view of the tail rotor.
Figure 5:
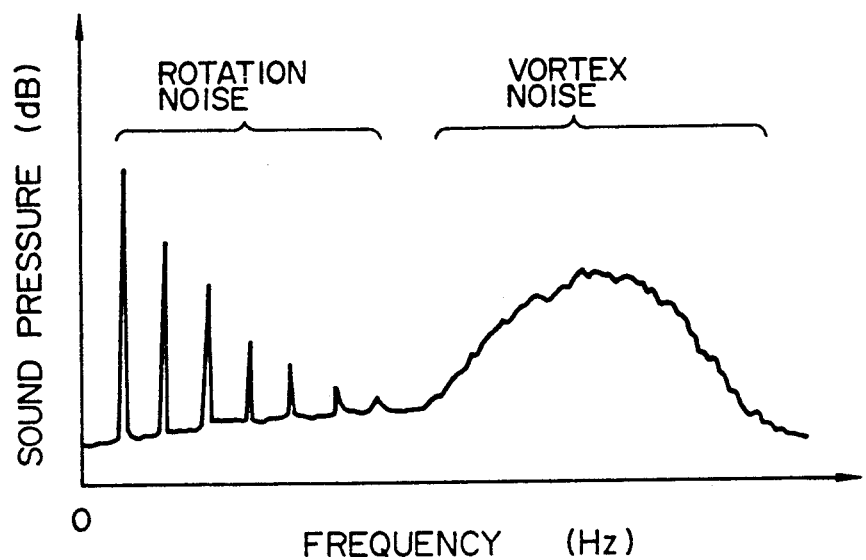
FIG. 5 is a graph showing results of analysis of frequency of noise generated by the tail rotor.

The movement of the spider 10 is transmitted to pitch horns 11 mounted respectively to the rotor blades 6 at proximal end portions thereof, so that each rotor blade 6, supported by two bearings 12 and 13 shown in FIG. 4, is pivoted around a pitch axis 14 to provide a required pitch angle according to the movement of the pitch horn 11. As shown in FIG. 5, the noise generated by the rotor system consists of so-called rotation noise including frequencies which are equal to integral multiples of the rotational speed, and so-called wide-band noise including frequencies much higher than those of the rotation noise. The wide-band noise is generated due to a vortex produced at the tip and the trailing edge of the rotor blade. However, in the case of the ducted fan-type tail rotor, since the blade tips are quite close to the duct 5, the tip vortex is not produced, and therefore the wide-band noise is not a problem.

Figure 6A:
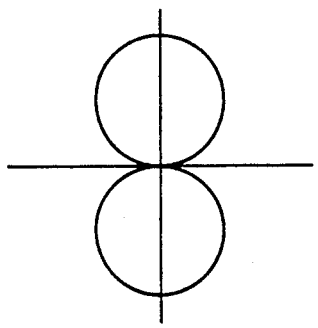
FIGS. 6A to 6D are diagrams showing the noise from the rotor blades and the directionality thereof.
Figure 6B:
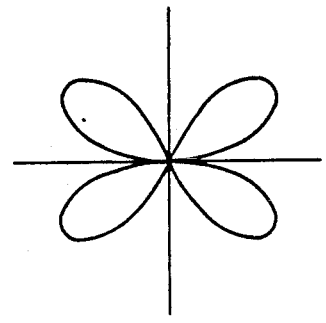
Figure 6C:
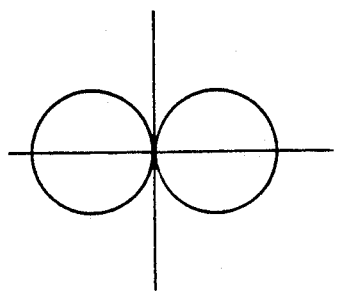
Figure 6D:
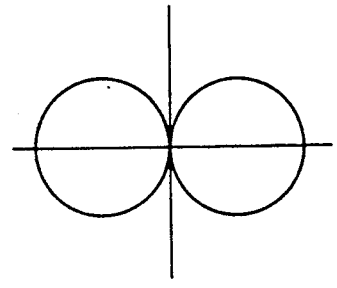

The rotation noise of the rotor blades can be broadly classified into noise (FIG. 6A) due to the blade tip vortex, noise (FIG. 6B) due to the thrust, noise (FIG. 6C) due to the rotation torque, and noise (FIG. 6D) due to the thickness of the blade. In the drawings, the abscissa represents the direction of the plane of rotation, and the ordinate represents the direction of the axis of rotation. In the case of the ducted fan-type tail rotor, the noise due to the blade tip vortex does not pose any problem since no tip vortex is generated, as described above. With respect to the noise due to the rotation torque and the noise due to the blade thickness, any components are recognized in the direction of the plane of rotation plane. However, since the blades are covered by the duct in this direction, these noises can be ignored. As a result, the noise from the ducted fan-type tail rotor is mainly the noise due to the thrust. The rotation noise, such as the noise due to the thrust, is constituted by components, frequencies of which are integer multiples of the rotational frequency of the rotor blades.

Figure 7:
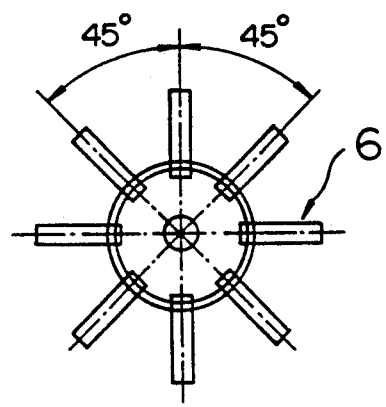
FIG. 7 is a schematic view showing a tail rotor having rotor blades arranged at equal angular intervals.
Figure 8:
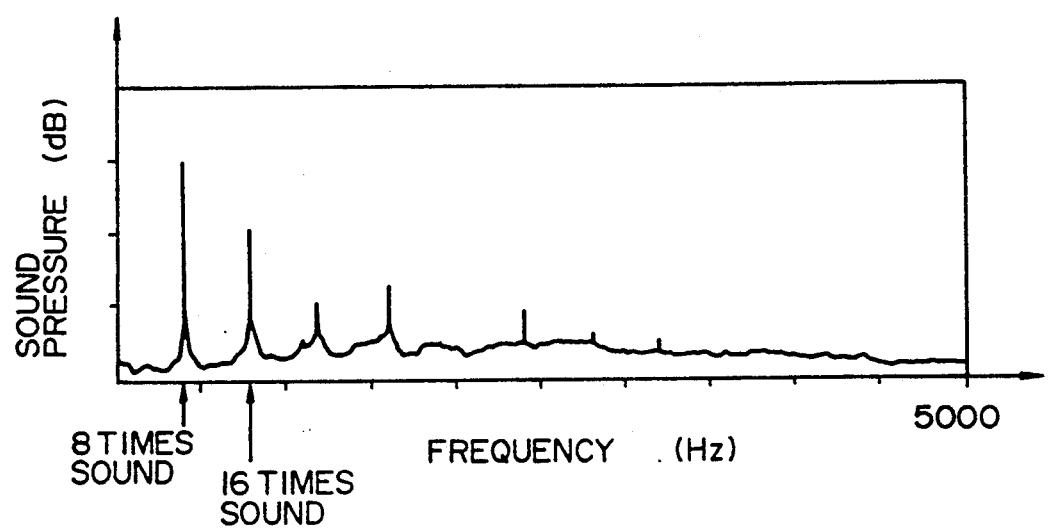
FIG. 8 is a graph showing results of analysis of the frequency of the noise in the rotor blades of FIG. 7.

When the eight rotor blades 6 are arranged at equal angular intervals, these rotor blades are 45° different in phase from one another, as shown in FIG. 7. Therefore, when the noises from these rotor blades 6 are combined together, the only remaining components are 8 times and 16 times the rotational frequency of the rotor blades 6, as shown in FIG. 8. The other components cancel out one another. The lower the frequency is, the higher the sound pressure level is, and therefore in the case of the arrangement of FIG. 7, only the frequency component 8 times the rotational speed is very strongly audible.

In the case of the ducted fan-type actual tail rotor, the frequency of this sound is close to 1000 Hz.

Figure 9:
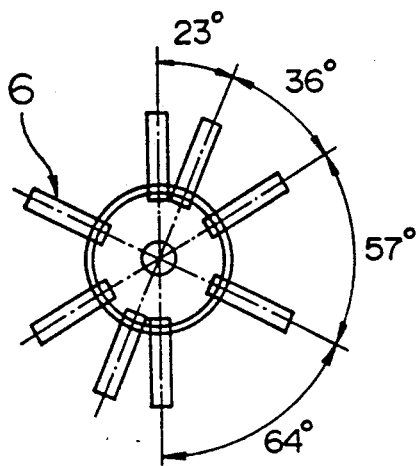
FIG. 9 is a schematic view showing a tail rotor having rotor blades arranged at unequal angular intervals.

In FIG. 9, eight rotor blades 6 are arranged, for example, at point symmetry with respect to a centre of rotation at angular intervals of 23°, 36°, 57° and 64°. In this case, the noise is constituted by components having frequencies which are integer multiples of twice the rotational frequency of the rotor blades. The sound having a frequency of which is twice the rotational frequency of the rotor blades is mainly audible, and the sound pressure level is low.

Figure 10:
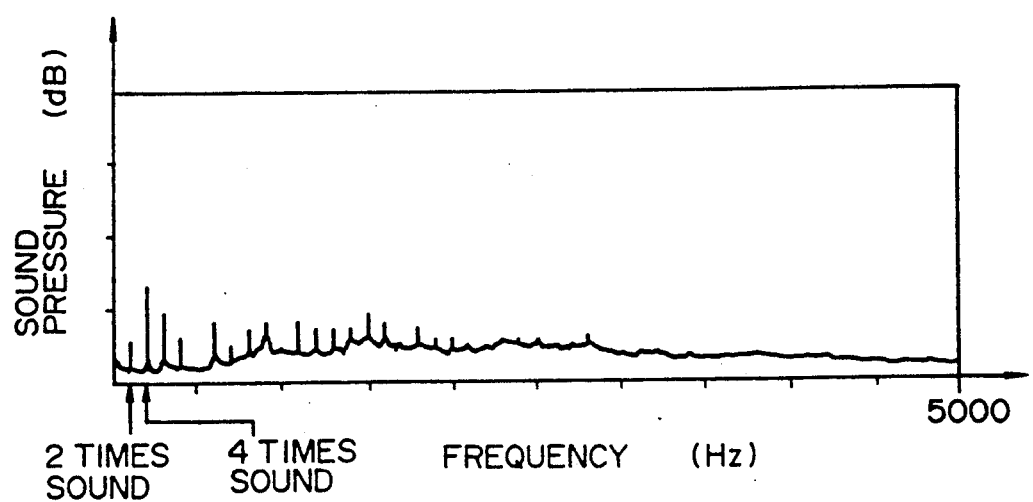
FIG. 10 is a graph showing results of analysis of the frequency of the noise in the rotor blades of FIG. 9.

However, it is difficult to arrange the rotor blades close to each other, as described above. The rotor blades interfere with each other, or the pitch horns 11 interfere with each other, and therefore it is difficult to obtain the arrangement shown in FIG. 9. On the other hand, if the interval between the rotor blades 6 is increased to a structurally-allowable degree, a marked noise reduction effect as in FIG. 10 can not be obtained.

In embodiments of the present invention, two types of blade constructions (described below) are employed.

Figure 11:
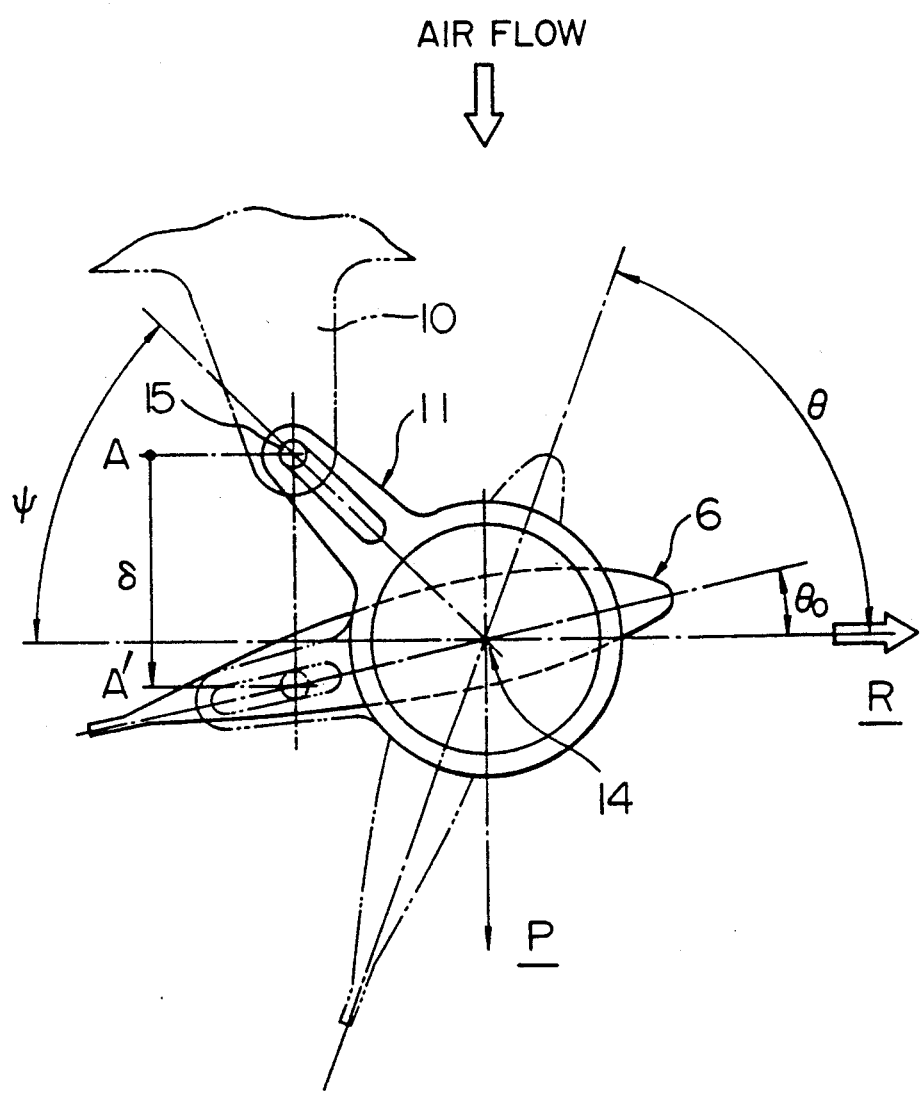
FIG. 11 is a cross-sectional view taken along Line XI—XI of FIG. 4, showing the mounting of the rotor blade on a spider.
Figure 12:
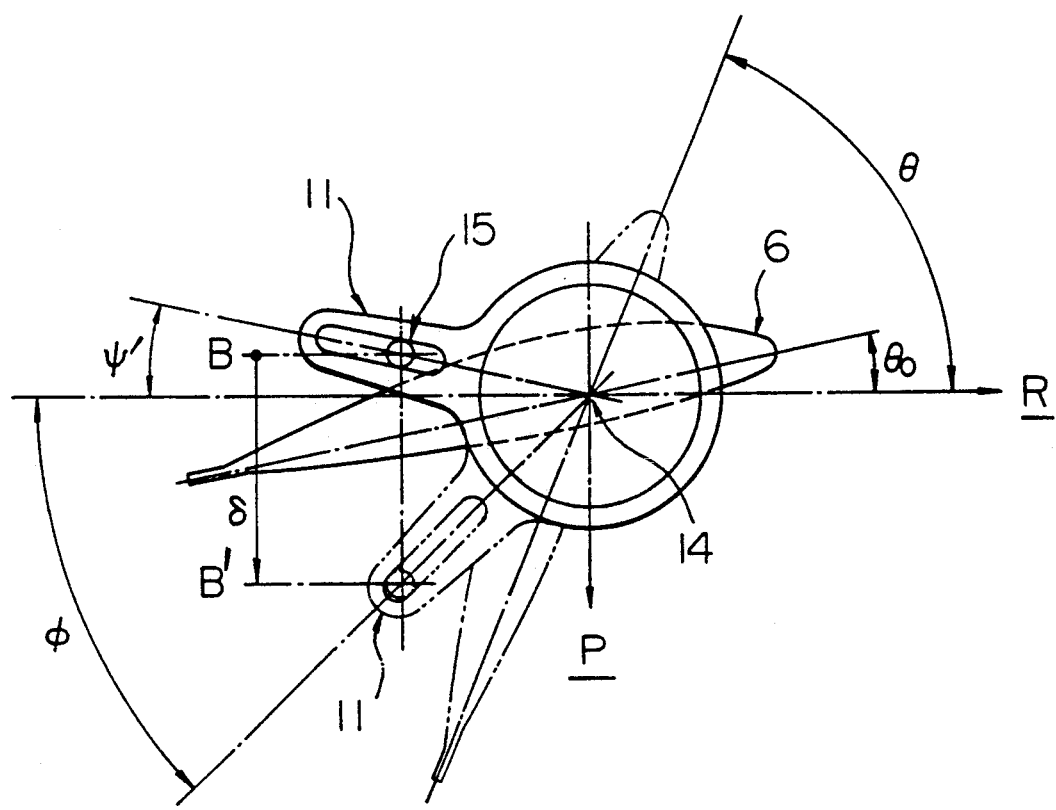
FIG. 12 is a cross-sectional view showing another mounting of a rotor blade on a spider.

In the first blade construction, as shown in FIGS. 11 and 12, the pitch horns 11 and the slide bearings 15 are employed, while according to the second construction, as shown in FIG. 18, a pitch link 18 is employed.

1. First Construction

As shown in FIG. 11, a spider 10 is connected to pitch horns 11 through slide bearings 15. When the spider 10 moves in a direction P perpendicular to a direction R of rotation of the rotor blades, the pitch horn 11 swings about a pitch axis 14 in response to this movement of the spider 10. Since the pitch horn 11 and the rotor blade 6 are integrally connected together, the rotor blade 6 is shifted between a position indicated by solid lines and a position indicated by two dot lines. The pitch horn 11 is mounted to the rotor blade 6 in such a manner that the pitch horn 11 and the direction R define therebetween a mounting angle $\psi$. The spider 10 can be moved by a displacement $\delta$ between a position A and a position A' in the direction P through the operation of the pilot. A relation between the displacement $\delta$ of the spider 10 and the pitch angle $\theta$ of the rotor blade 6 is varied within a range of a solid line portion A—A' of the curve indicated by a dot-and-dash line in FIG. 13, or $\delta = a \cdot \tan \theta$ (a: constant).

Figure 13:
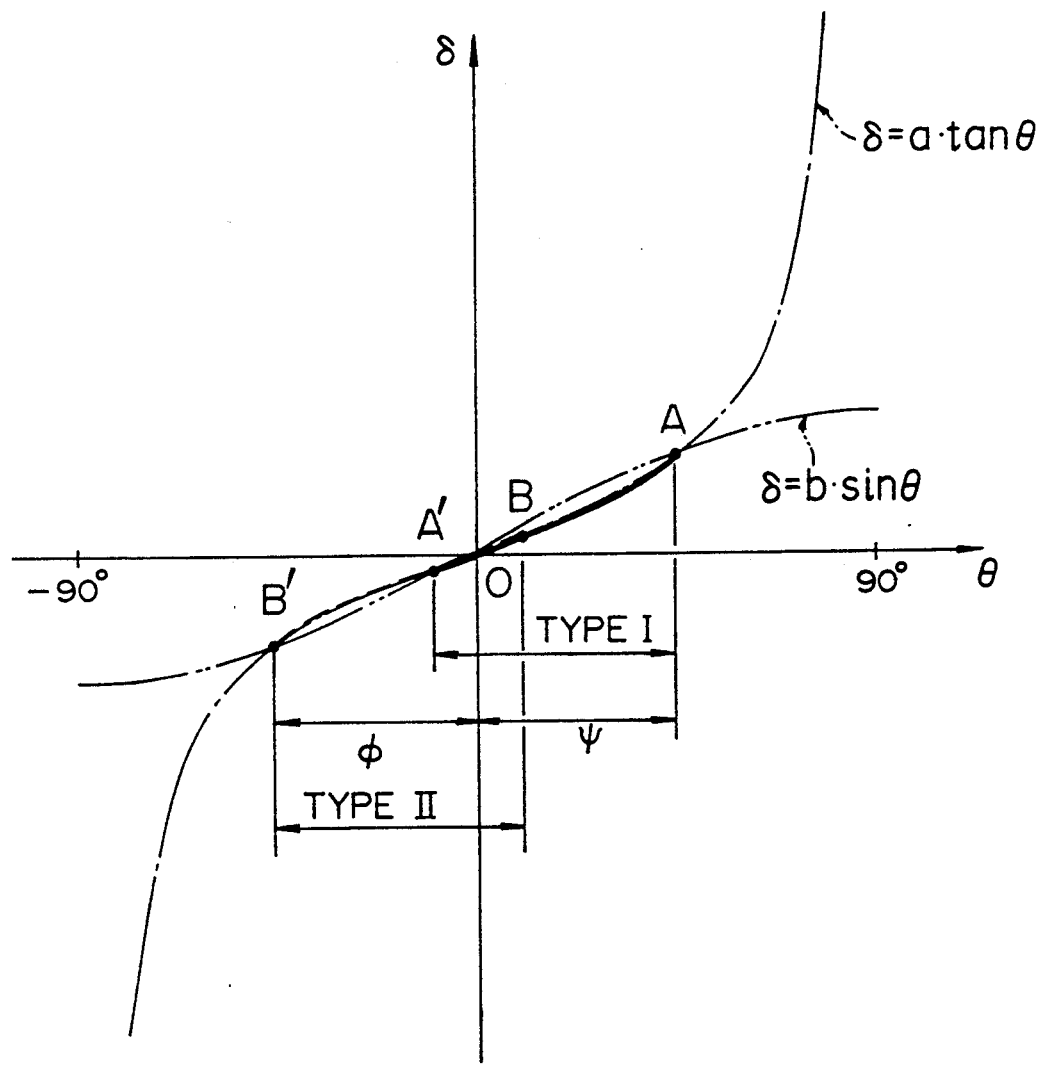
FIG. 13 is a graph showing the relation between the amount of movement of the spider and the pitch angle.
Figure 14:
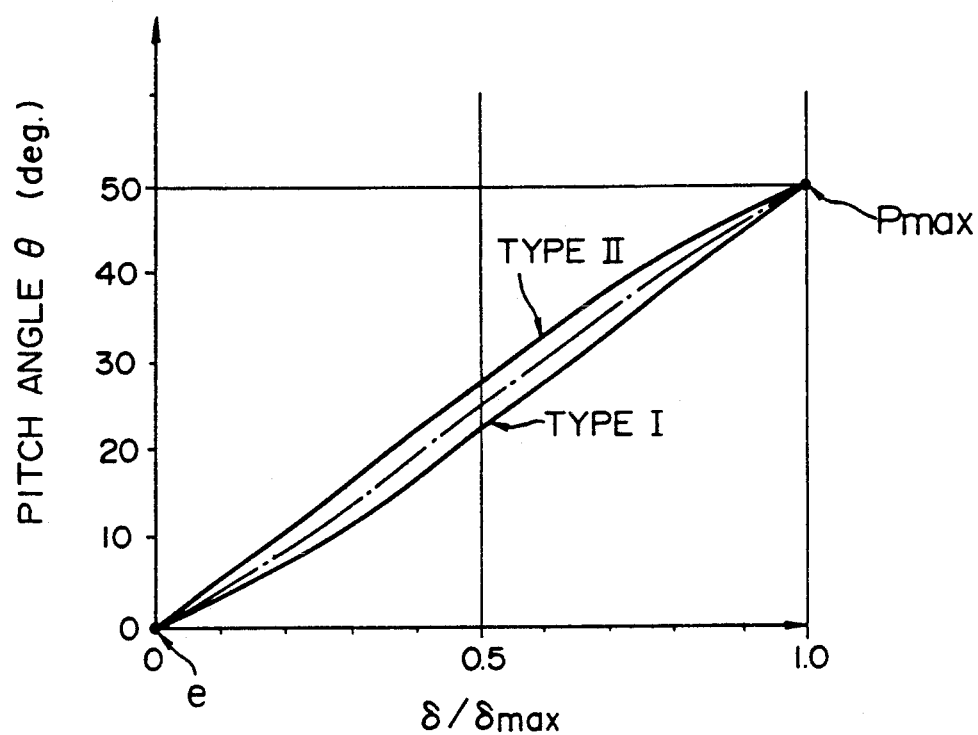
FIG. 14 is a graph showing the relation between the spider movement rate and the pitch angle.

If the mounting angle $\psi'$ is made small as shown in FIG. 12, the operative range of the pitch angle $\theta$ is somewhat shifted to a range of the dotted line B—B' of the curve indicated by a dot-and-dash line in FIG. 13. The relations between $\delta/\delta\max$ and $\theta$ in both constructions of FIGS. 11 and 12 are shown in FIG. 14. In this case, the construction of FIG. 11 is called "type I", and the construction of FIG. 12 is called "type II".

The initial pitch angles $\theta_0$ of both types at a point where $\delta$ is zero are equal to each other. The pitch angles $\theta$ become different from each other at a middle portion of the ratio $\delta/\delta\max$. If the absolute value of the angle $\phi$ of the pitch horn 11 with respect to the direction R at the maximum pitch position B' in the type II rotor blades is set to be equal to the absolute value of the angle ψ of the pitch horn 11 with respect of the direction R at the maximum pitch position A′ in the type I rotor blades, namely if φ==ψ, the solid line portion A—A′ of the curve indicated by a dot-and-dash line in FIG. 13 for type I and the dotted line portion B—B′ of the curve indicated by a dot-and-dash line in FIG. 13 become symmetrical with respect to the origin of the tangential curve shown in FIG. 13. Therefore, the pitch angles of the type I and the type II rotor blades coincide with each other at the maximum pitch position Pmax in FIG. 14. At the maximum pitch position, the rotor blade 6 is rotating in an almost stalled condition, and therefore it is preferred that the pitch angles in both types be the same at such position.

In this case, at the low pitch angle (that is, the maximum thrust) and at the high pitch angle (that is, the maximum reverse thrust), all rotor blades 6 of both types operate in cooperation with one another to achieve the maximum performance. In normal operation (that is, at a middle range of the pitch angles), because of the different blade pitch angles, the thrust is produced substantially by half of the rotor blades 6, or four rotor blades 6. Therefore, the rotation noise is close to a quadruple sound, and the frequency of the noise is lowered.

Figure 15:
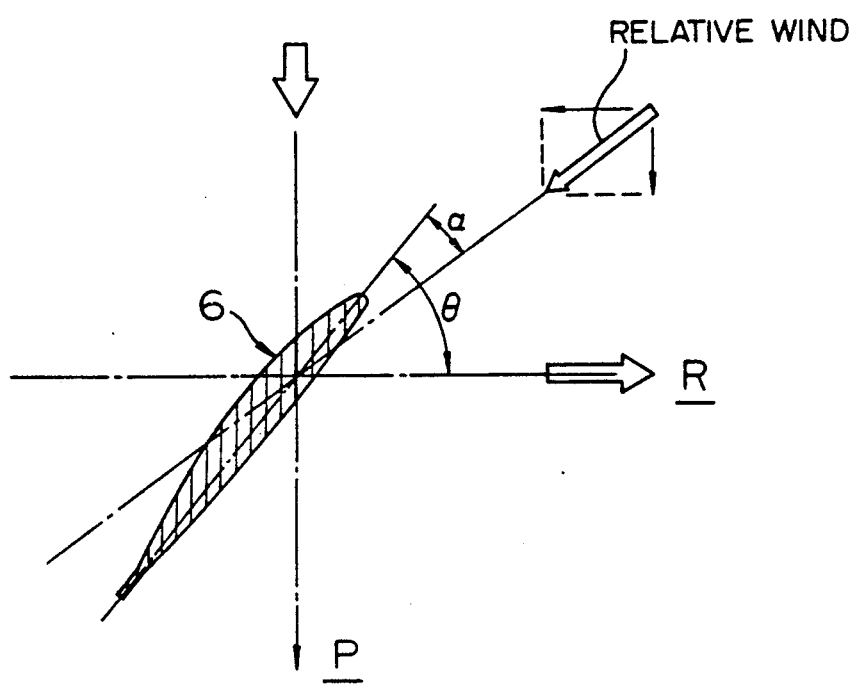
FIG. 15 is a cross-sectional view showing the relation between the pitch angle of the rotor blade and the angle of attack.

In the normal operating condition near an airport, the ratio δ/δmax is generally 0.3 to 0.7. In this range, the difference in the pitch angle between the type I and the type II construction is about 5°. On the other hand, as shown in FIG. 15, a relative wind against the rotor blade 6 is the resultant of a component induced by the tail rotor in the direction P and a component of the wind acting in the direction R, and the angle of attack of the rotor is α. In the above normal operating condition, the angle of attack is about 5°.

Figure 16:
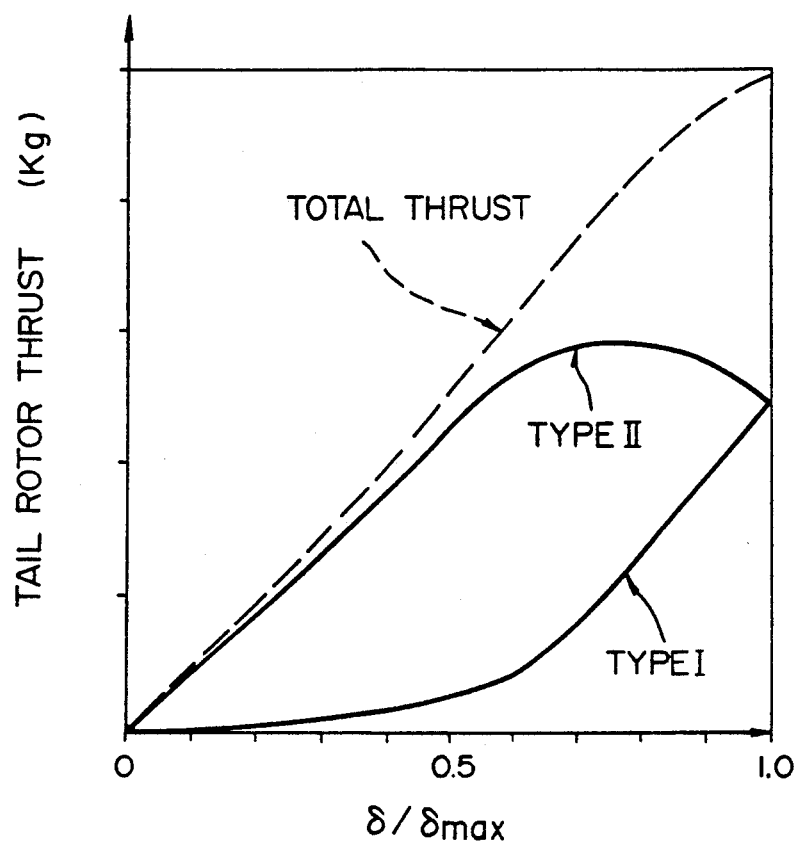
FIG. 16 is a graph showing the relation between the spider movement rate and the thrust.

Therefore, the thrusts produced respectively by the type I rotor blades and the type II rotor blades vary as indicated in solid lines in FIG. 16. For most of the ratio δ/δmax, the rotor blades of the type II construction mainly contribute to thrust generation. At the time of the maximum thrust, each of the rotor blades of the type I and the type II construction generates its maximum thrust which is equal for each type. Therefore, the maximum thrust performance is in no way inferior to that obtained with a conventional propeller-type tail rotor in which each of the blades produces the same thrust.

Figure 17:
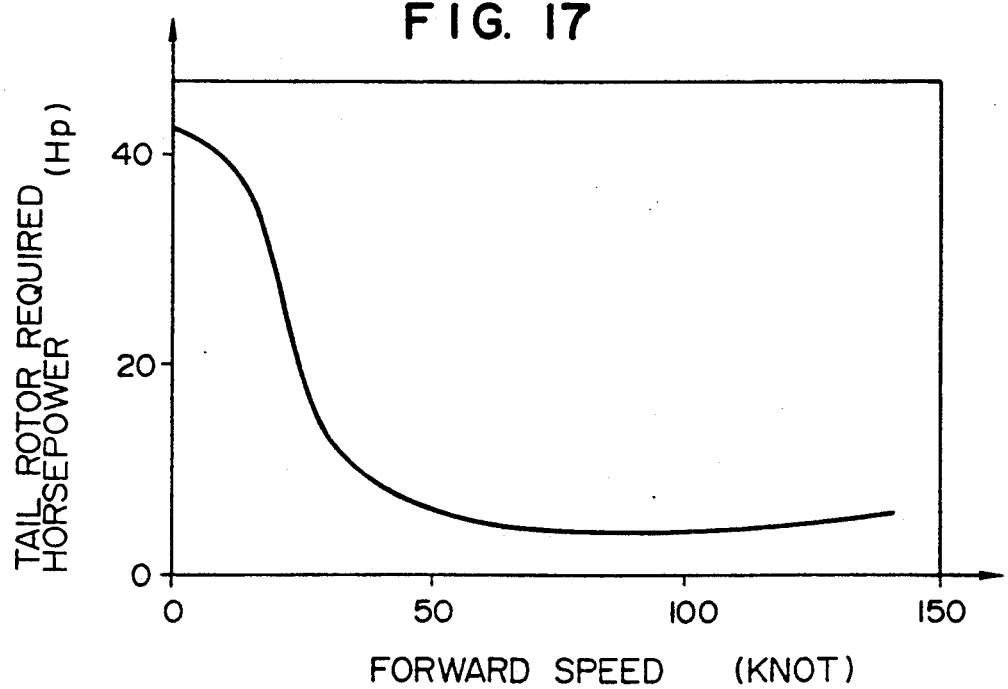
FIG. 17 is a graph showing the relation between the speed of the ducted fan-type tail rotor and required horsepower.

In the rotor craft with the ducted fan-type tail rotor, as shown in FIG. 17, during a forward flight, a vertical tail produces a counter torque, and then the tail rotor 2 almost idles, and therefore the noise is substantially reduced. Therefore, the noise of the tail rotor becomes a problem when the rotor craft is in a low-speed flight and during hovering. Such maneuvers are normally carried out near the ground and at around δ/δmax=0.5. Therefore, is apparent from FIG. 16, it will be appreciated that the tail rotor including the type I and II blades is operated effectively.

2. Second Construction

In this second construction, a pitch link 18 connects the spider 10 with the pitch horn 11, as shown in FIG. 18. The spider 10 and the pitch horn 11 are connected through spherical joints 19 provided at opposite ends of the pitch link 18. In accordance with the movement of the spider 10 in the direction P, the pitch horn 11 can be swung about a pitch axis 14 between a position indicated by a solid line and a position indicated by a two-dot line. In this case, as in the above embodiment, the pitch horn 11 is mounted to the rotor blade 6 in such a manner that the pitch horn 11 and the direction R define therebetween a mounting angle ψ (FIG. 18). A relation between the displacement δ of the spider 10 and the pitch angle θ of the rotor blade 6 is varied along a curve indicated by a two-dot line in FIG. 13, or δ=b·sin θ (b: constant).

By using two kinds of rotor blade groups different in the mounting angle ψ of the pitch horn 11, the thrust produced by each group of rotor blades 6 can be varied as in the above embodiment. In this second construction, since the pitch link 18 is of a turnbuckle construction, an unbalance of the thrust among the rotor blades 6 can be finely adjusted by changing the length of the pitch link 18.

Further, in order to obtain the two blade constructions, the first construction and the second construction may be used in combination.

Figure 19:
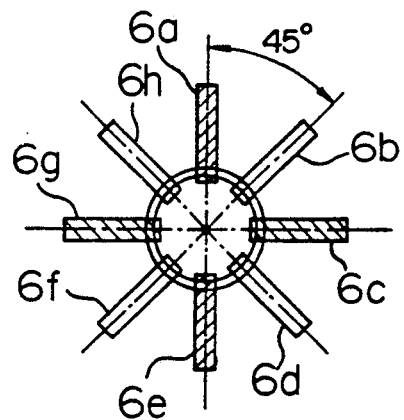
FIGS. 19 to 21 are views showing other embodiments of the present invention, respectively.

In a first embodiment, as shown in FIG. 19, eight rotor blades 6a to 6h are disposed at equal angles, and the type I rotor blades and type II rotor blades are arranged alternately. In normal operation, the type II rotor blades 6a, 6c, 6e and 6g, which are hatched in the drawings, generate the thrust, while non-hatched type I rotor blades 6b, 6d, 6f and 6h idle. According to this arrangement the noise generated mainly includes component having frequencies which are halves of those generated when all the blades uniformly produce the thrust. As described above, the rotor blades and the spider are connected together by the first construction or the second construction, or a combination of them.

Figure 20:
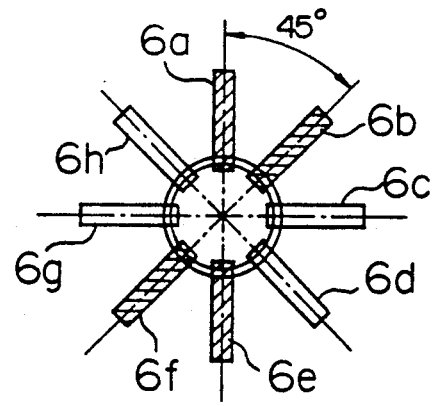

In a second embodiment, as shown in FIG. 20, eight rotor blades 6a to 6h are disposed at equal angular intervals. A first pair of adjacent rotor blades 6a and 6b and a second pair of adjacent rotor blades 6e and 6f, which are disposed opposite to the first pair, are type II rotor blades and generate the thrust. The remaining rotor blades 6c, 6d, 6g and 6h are type I rotor blades and idle. In this case, the noise generated mainly includes components, having frequencies which are further reduced as compared with the first embodiment, and specifically the frequencies are quarters of those generated when all the blades uniformly produce the thrust. Therefore, it is hardly felt noisy.

In the first and the second embodiments, the rotor blades 6a to 6h are disposed at equal angular intervals, and therefore no structural problems with the blade mounting portion arise, and problems with the blade balance and vibration are not serious.

Figure 21:
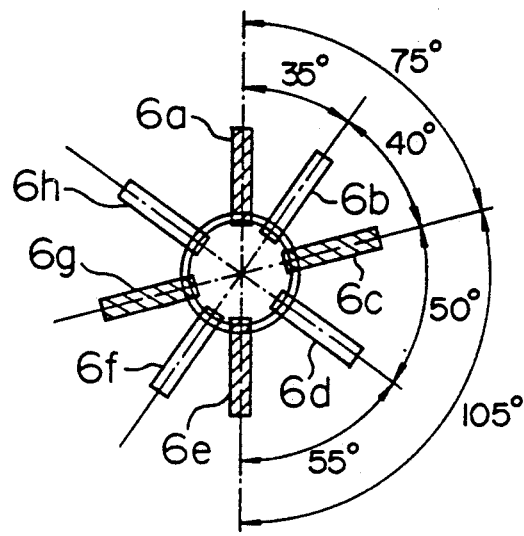

In a third embodiment, as shown in FIG. 21, the rotor blades 6a to 6h are disposed at unequal angular intervals so that the adjacent rotor blades don't interfere with each other. A first pair of rotor blades 6a and 6c, a second pair of rotor blades 6e and 6g, which are disposed opposite to the first pair, are type II rotor blades and generate the thrust. The remaining rotor blades 6b, 6d, 6f and 6h are type I rotor blades and idle. In this case, the high-frequency component of the noise is further reduced, so that the noise is reduced.

As described above, according to the present invention, in the tail rotor of the rotor craft, the differences in the blade pitch angle are generated among the rotor blades in the normal operating range of the rotor craft. Accordingly, the sound pressure of the noise generated from the tail rotor is reduced, and a jarring high-frequency noise is converted into a low-frequency noise which is not so jarring. Further, without the tip speed reduction, which would otherwise lower performance and cause the vibration problems the noise can be reduced, and therefore the performance can be maintained in a good condition. Further, even if a stall occurs in the rotor blade whose pitch angle is large as a result of increasing the angle of attack due to an abrupt blade control, the group of rotor blades whose pitch angle is small remain unstalled, and therefore the rotor craft is not brought into a dangerous condition such as a totally-stalled condition, and a higher safety is achieved.

In the tail rotors according to the present invention, the conventional pitch horn is modified, and the number of components and the cost are not increased. Further, since a ducted fan-type tail rotor is employed, it does not damage persons or obstacles, and it is not influenced by the vertical tail and by cross winds. Namely, a high safety and performance can be obtained without a noise problem which is inevitably posed by a conventional ducted fan-type tail rotor.

What is claimed is:

1. A tail rotor of a rotor craft, which is surrounded by a tubular duct, said tail rotor comprising:
   at least six rotor blades; and
   pitch horns, each mounted to respective rotor blades, each of said pitch horns being swingable to change a pitch angle of said respective rotor blades, some of said pitch horns being mounted to a first type of rotor blades of said rotor blades at a mounting angle larger than a reference mounting angle required to obtain a predetermined thrust, and the remainder of said pitch horns being mounted to a second type of rotor blades of said rotor blades at a mounting angle smaller than the reference mounting angle.

2. A tail rotor according to claim 1, wherein said first type of rotor blades and said second type of rotor blades are alternately disposed in a direction of rotation of said rotor blades.

3. A tail rotor according to claim 1, wherein a pair of said first type of rotor blades adjacent each other and a pair of said second type of rotor blades adjacent each other are alternately disposed in a direction of rotation of said rotor blades.

4. A tail rotor according to claim 2, wherein said rotor blades are disposed at unequal angular intervals.

5. A tail rotor according to claim 3, wherein said rotor blades are disposed at unequal angular intervals.

6. A tail rotor according to claim 2, wherein said rotor blades are disposed at unequal angular intervals.

7. A tail rotor according to claim 3, wherein said rotor blades are disposed at unequal angular intervals.

8. A tail rotor according to claim 1, wherein said pitch horns are so mounted to said rotor blades that when an angle between a reference and the pitch horn mounted to the first type of rotor blade is $\psi$, an angle between the reference and the pitch horn mounted to the second type of rotor blade is $-\psi$.

9. A tail rotor according to claim 1, which further includes a spider connected to said pitch horns through slide bearings, and wherein said pitch angle is changed by moving said spider.

10. A tail rotor according to claim 2 which further includes a spider connected to said pitch horns through slide bearings, and wherein said pitch angle is changed by moving said spider.

11. A tail rotor according to claim 3 which further includes a spider connected to said pitch horns through slide bearings, and wherein said pitch angle is changed by moving said spider.

12. A tail rotor according to claim 4 which further includes a spider connected to said pitch horns through slide bearings, and wherein said pitch angle is changed by moving said spider.

13. A tail rotor according to claim 5 which further includes a spider connected to said pitch horns through slide bearings, and wherein said pitch angle is changed by moving said spider.

14. A tail rotor according to claim 6 which further includes a spider connected to said pitch horns through slide bearings, and wherein said pitch angle is changed by moving said spider.

15. A tail rotor according to claim 7 which further includes a spider connected to said pitch horns through slide bearings, and wherein said pitch angle is changed by moving said spider.

16. A tail rotor according to claim 8 which further includes a spider connected to said pitch horns through slide bearings, and wherein said pitch angle is changed by moving said spider.

17. A tail rotor according to claim 1 which further includes a spider connected to said pitch horns through spherical joints provided at opposite ends of a pitch link, and wherein said pitch angle is changed by moving said spider.

18. A tail rotor according to claim 2, which further includes a spider connected to said pitch horns through spherical joints provided at opposite ends of a pitch link, and wherein said pitch angle is changed by moving said spider.

19. A tail rotor according to claim 3 which further includes a spider connected to said pitch horns through spherical joints provided at opposite ends of a pitch link, and wherein said pitch angle is changed by moving said spider.

20. A tail rotor according to claim 4 which further includes a spider connected to said pitch horns through spherical joints provided at opposite ends of a pitch link, and wherein said pitch angle is changed by moving said spider.

21. A tail rotor according to claim 5 which further includes a spider connected to said pitch horns through spherical joints provided at opposite ends of a pitch link, and wherein said pitch angle is changed by moving said spider.

22. A tail rotor according to claim 6 which further includes a spider connected to said pitch horns through spherical joints provided at opposite ends of a pitch link, and wherein said pitch angle is changed by moving said spider.

23. A tail rotor according to claim 7 which further includes a spider connected to said pitch horns through spherical joints provided at opposite ends of a pitch link, and wherein said pitch angle is changed by moving said spider.

24. A tail rotor according to claim 8 which further includes a spider connected to said pitch horns through spherical joints provided at opposite ends of a pitch link, and wherein said pitch angle is changed by moving said spider.

25. A tail rotor according to claim 1 wherein the number of pitch horns mounted to said first type of rotor blades is about half the total number of pitch horns.

26. A tail rotor according to claim 2 wherein the number of pitch horns mounted to said first type of rotor blades is about half the total number of pitch horns.

27. A tail rotor according to claim 3 wherein the number of pitch horns mounted to said first type of rotor blades is about half the total number of pitch horns.

28. A tail rotor according to claim 4 wherein the number of pitch horns mounted to said first type of rotor blades is about half the total number of pitch horns.

29. A tail rotor according to claim 5 wherein the number of pitch horns mounted to said first type of rotor blades is about half the total number of pitch horns.

30. A tail rotor according to claim 6 wherein the number of pitch horns mounted to said first type of rotor blades is about half the total number of pitch horns.

31. A tail rotor according to claim 7 wherein the number of pitch horns mounted to said first type of rotor blades is about half the total number of pitch horns.

32. A tail rotor according to claim 8 wherein the number of pitch horns mounted to said first type of rotor blades is about half the total number of pitch horns.

* * * * *

UNITED STATES PATENT AND TRADEMARK OFFICE
CERTIFICATE OF CORRECTION

PATENT NO. : 5,306,119
DATED : April 26, 1994
INVENTOR(S) : Bandoh et al.

It is certified that error appears in the above-indentified patent and that said Letters Patent is hereby corrected as shown below:

Column 7, line 48, change "unequal" to --equal--;

Column 7, line 50, change "unequal" to --equal--.

Signed and Sealed this

Fourth Day of October, 1994

BRUCE LEHMAN

Attest:

Attesting Officer

Commissioner of Patents and Trademarks